(12) United States Patent
Roberts

(10) Patent No.: US 10,656,249 B1
(45) Date of Patent: May 19, 2020

(54) PIPE OVALITY AND PIT DEPTH MEASURING AND ANALYZING DEVICE

(71) Applicant: Lowell E. Roberts, Pell City, AL (US)

(72) Inventor: Lowell E. Roberts, Pell City, AL (US)

( * ) Notice: Subject to any disclaimer, the term of this patent is extended or adjusted under 35 U.S.C. 154(b) by 0 days.

(21) Appl. No.: 16/663,805

(22) Filed: Oct. 25, 2019

(51) Int. Cl.
| | |
|---|---|
| *G01S 17/08* | (2006.01) |
| *G01S 17/89* | (2020.01) |
| *F16L 55/07* | (2006.01) |
| *G01B 11/02* | (2006.01) |
| *G01B 11/22* | (2006.01) |
| *G01S 7/48* | (2006.01) |
| *G01S 7/481* | (2006.01) |

(52) U.S. Cl.
CPC ............ *G01S 7/4808* (2013.01); *F16L 55/07* (2013.01); *G01B 11/026* (2013.01); *G01B 11/22* (2013.01); *G01S 7/4817* (2013.01); *G01S 17/08* (2013.01); *G01S 17/89* (2013.01)

(58) Field of Classification Search
CPC ...... G01S 7/4808; G01S 7/4817; G01S 17/08; G01S 17/89; F16L 55/07; G01B 11/22; G01B 11/026

USPC ......................................................... 356/4.01
See application file for complete search history.

(56) References Cited

U.S. PATENT DOCUMENTS

| | | | |
|---|---|---|---|
| 5,867,275 A * | 2/1999 | Curtis, Jr. | ............ G01B 11/105 356/635 |
| 6,862,099 B2 | 3/2005 | Lam et al. | |
| 2009/0038398 A1 * | 2/2009 | Lavoie | ................. G01N 29/225 73/637 |

* cited by examiner

*Primary Examiner* — Daniel L Murphy
(74) *Attorney, Agent, or Firm* — Volta Law Group, LLC

(57) ABSTRACT

A device is provided that measures the variance in ovality, for example, in a pipe, in comparison with a circle. The device will measure, for example, a number of distance points around the outside diameter of a pipe using, in one embodiment, laser distance measuring technology, and optionally using a combination of wireless data transfer including Bluetooth and CAD technology, a series of data points can be generated and plotted. It will then be determined which data points match a circle template, and which do not, with the difference in ovality then being calculated. The device can also measure, through distance measurements, the depth of pits on the exterior surface of a pipe.

15 Claims, 3 Drawing Sheets

PIPE OVALITY AND PIT DEPTH MEASURING AND ANALYZING DEVICE

BACKGROUND OF THE DISCLOSURE

Field of the Invention

The invention generally relates to a device for measuring the ovality of pipes and the depth of pits in pipes.

Description of the Related Art

Ovality gauges are currently extremely heavy and employ bolts that are screwed down to the pipe. The difference in ovality is then calculated manually. The weight of current ovality gauges is considered a great drawback to their use.

Generally, workers in the field, establish ovality using spirit type bubble levels and a measuring tape, and then calculate the amount out of round manually. These approaches are very slow and are not accurate.

SUMMARY OF THE INVENTION

A device is provided that measures the ovality, for example, of a pipe, in comparison with a circle. The device will measure, for example, a plurality of distance points around the outside diameter of a pipe. The device is designed to be connected to a pipe to be measured or analyzed in a position that keeps the distance measuring device parallel with the pipe by placing a beam or telescoping beam that is connected to the distance measuring device in a position parallel with the length of the pipe. Using a combination of wireless data transfer including bluetooth, and CAD technology, a series of data points can be generated and plotted. It will then be determined which data points match a circle template, and which do not, with the difference in ovality then being calculated. The device can also measure, through distance measurements, the depth of pits on the exterior surface of a pipe.

Other features and aspects will be apparent from the following detailed description, the drawings, and the claims

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
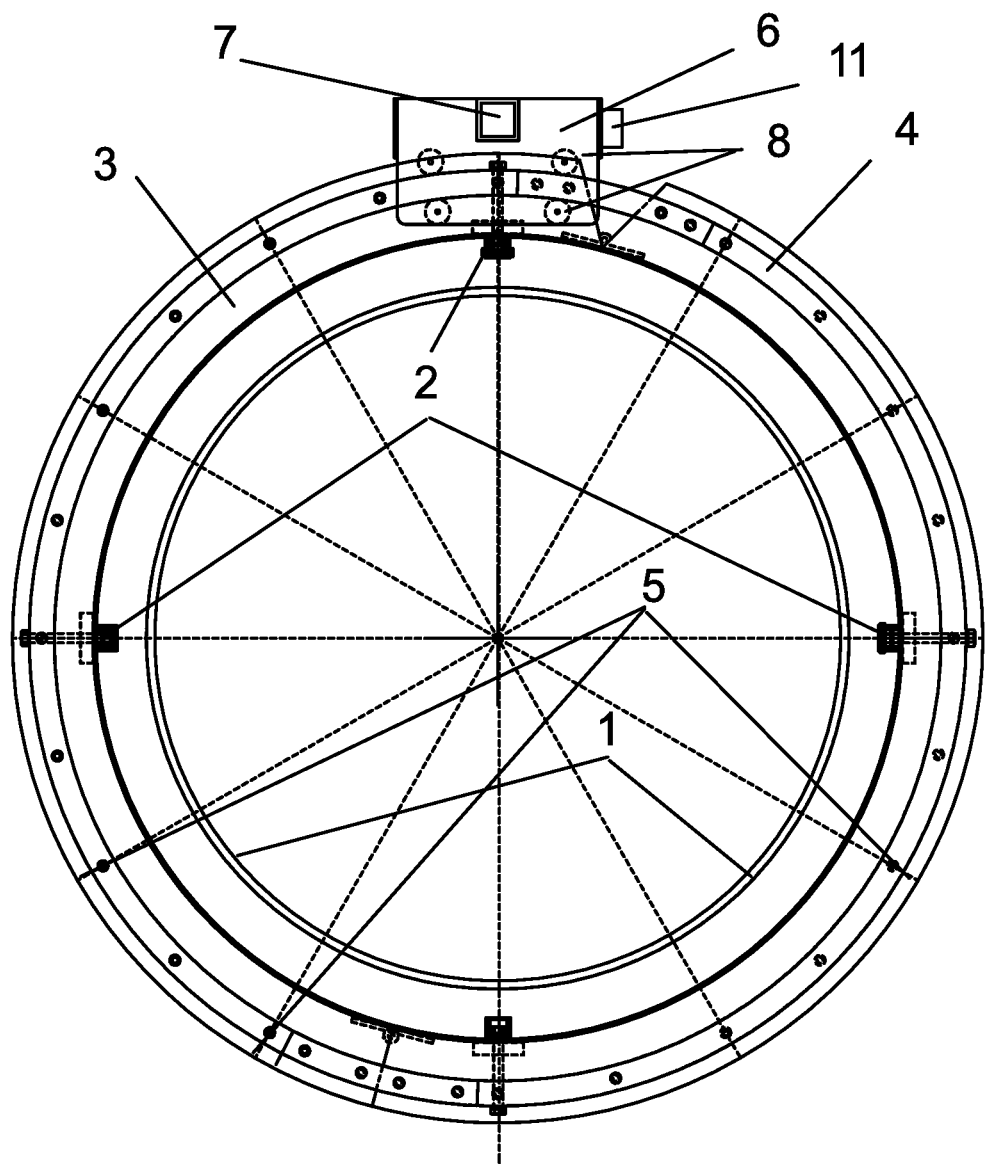
FIG. 1 shows a front view of an embodiment of the invention.

The following detailed description is provided to assist the reader in gaining a comprehensive understanding of the methods, devices, and/or systems, described herein. However, various changes, modifications, and equivalents of the methods, devices, and/or systems described herein will be apparent to an ordinary skilled artisan.

Disclosed is a device that measures the ovality, for example of a pipe, in comparison with a circle, preferably using laser distance measuring technology. For example, the device will measure a number of distance points around the outside diameter of a pipe using laser distance measuring technology, and using a combination of wireless data transfer including Bluetooth, and CAD technology, a series of data points will be generated and plotted. The distance from the scanning device to the pipe can be measured at a plurality of positions around the pipe wherein each distance measurement is made from the same distance from the pipe's undistorted circle at its outside diameter line. It will then be determined which data points match a circle template, and which do not, with the difference in ovality being calculated.

Each data point can be plotted and displayed on a tablet device or computer monitor as an overlay on a circle template. Additionally, a report can be generated that depicts the areas out of round and the distance (+/−) out of round (mm or inches) and the percentage (%) out of round, or both. It can then be determined whether a pipe is within a particular tolerance of ovality. Reports can be printed as needed.

The device, by employing a laser scanning device, can also measure pits in an exterior surface of, for example, a pipe which may be caused by various pipe conditions and\or causes, and the depth of pits can be calculated with respect to the overall pipe thickness. Records can again be generated.

The device may be relatively lightweight and easy to set up on site. The device can be made of metal which may include aluminum, iron, steel, stainless steel, brass, a combination of two or more of the above and\or a composite material. The device can be produced in various sizes and finishes to accommodate various sizes of pipes that may be subject to the type of testing accomplished.

The device is designed to be connected to a pipe to be measured or analyzed in a position that keeps the distance measuring device parallel with the pipe by placing a beam or telescoping beam that is connected to the distance measuring device in a position parallel with the length of the pipe. This ensures that the device will maintain a constant radius from a virtual line representing a round pipe template. Leveling modules, including digital leveling modules, may also be employed to measure the angle of a pipe which can help determine the angle of a support ring, rail, and rotating carriage as further shown below.

The pipe ovality and pit depth measuring and analyzing device may employ two (or more) different types of measuring/scanning devices that may be interchangeable on the beam or telescoping beam. For example, a laser distance type measuring device may be a primary device used for measuring the ovality of the pipe. This distance measuring device may be designed to measure only selected points along the circumference and selected length of the pipe being tested and compare the measured points to the corresponding points on a circle template.

The second device, a laser scanning type device may be the primary tool used to locate, measure, and analyze any pits on the pipe surface but can also be used to measure ovality when a more in-depth analysis is desired. The laser scanning type device can scan and analyze the entire pipe surface and entire circumference along the defined length of the pipe being tested, showing the location, diameter, and depth of any pits within the defined length of pipe.

The light weight and easy setup of the device can provide significant time and cost savings. This would be especially beneficial on a pipeline project where the testing of an anomaly in a pipe's ovality can stop work for an entire work-crew until the pipe's ovality anomaly is analyzed and corrected.

In one embodiment, FIG. 1 shows a front view of a pipe 1 to be clamped onto with stabilizing bolts 2 connected to the pipe. A primary support ring 3 is shown clamped to the pipe 1. A rail 4 for a rotating carriage 6 is also included. Rotating carriage 6 includes telescoping beam receptor 7 and ball bearing rollers 8. Rotating carriage 6 also includes digital leveling module 11.

Figure 2:
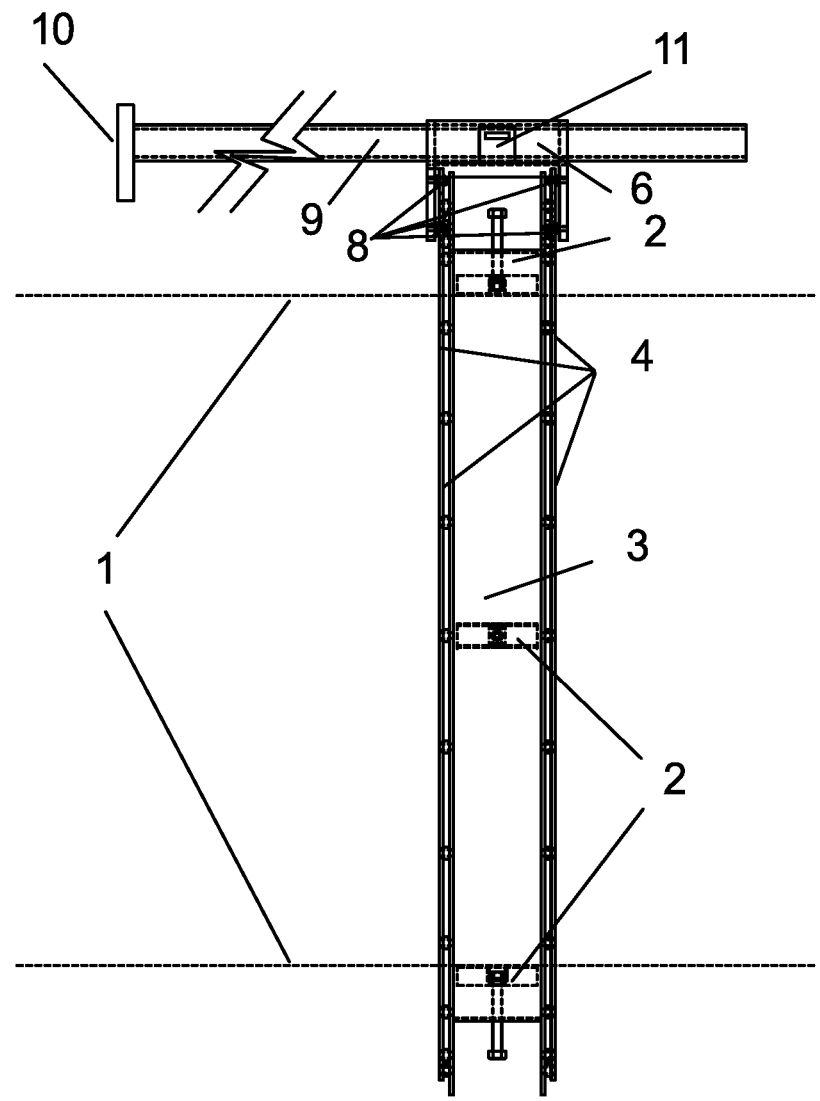
FIG. 2 shows a side view of an embodiment of the invention.

FIG. 2 shows a side view of the device shown in FIG. 1. It is noted that across the Figures like reference numerals refer to like components. FIG. 2 shows square beam 9 that slides horizontally through the telescoping beam receptor 7 of rotating carriage 6 and which allows measurements to be made at positions parallel to carriage ring 4. Square beam 9 is connected to laser measuring device 10. Rotating carriage 4 rotates around the pipe 1 and positions the laser measuring device 10 at various measuring locations. It may be further noted that bolts 2 may have a level foot to clamp the primary support ring 3 to pipe 1.

Figure 3:
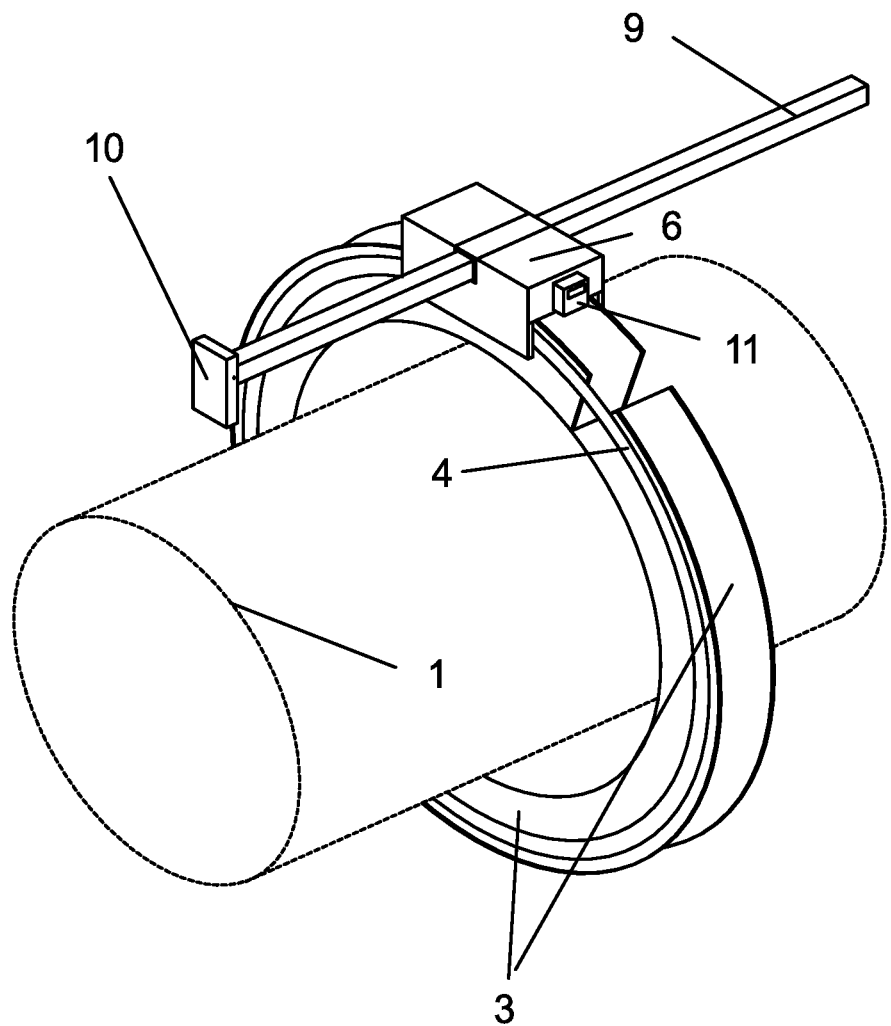
FIG. 3 shows an isometric view of an embodiment of the invention.

FIG. 3 shows an isometric view of an embodiment of the invention.

While this disclosure includes specific examples, it will be apparent after a complete understanding of the disclosure of this application has been attained that various changes in form and details may be made in these examples without departing from the spirit and scope of the claims and their equivalents.

What is claimed is:

1. A device for measuring the ovality of a pipe comprising:
    a support ring connected to the pipe;
    a rail for a carriage connected to the pipe;
    a rotating carriage comprising a beam receptor that can rotate around the pipe on the support ring and the rail;
    a beam disposed in the beam receptor; and
    a distance measuring device connected to the beam.

2. The device of claim 1, wherein the distance measuring device is a laser distance measuring device or a laser scanning device.

3. The device of claim 1, further comprising carriage stops on the support ring or rail or both.

4. The device of claim 1, further comprising bolts connected to the pipe that connect to the support ring and rail.

5. The device of claim 1, wherein the rotating carriage comprises ball bearing rollers.

6. The device of claim 1, wherein the beam provides measurements by the distance measuring device parallel to the pipe.

7. The device of claim 1, wherein the rotating carriage further comprises wireless data transfer electronics.

8. The device of claim 1, wherein the beam is a telescoping beam.

9. The device of claim 1, further including a leveling module to measure the angle of the pipe.

10. A method of measuring the ovality of a pipe with the device of claim 1 comprising:
    measuring the distance from the distance measuring device to the pipe at a plurality of positions around the pipe wherein each distance measurement is made from the same distance from the pipe's undistorted circle at its outside diameter line;
    calculating the difference in ovality of the pipe from a circle based on the distance measurements made by the distance measuring device.

11. The method of claim 10, wherein the distance measurements are transmitted to a tablet device or a computer via wireless data transmission.

12. The method of claim 11, wherein the tablet device or computer using CAD software shows the distance measurements as an overlay on a circle template.

13. The method of claim 10, the amount out of round from a circle of the ovality of the pipe is calculated as a distance in millimeters or inches, or as a percentage.

14. A method of measuring pit depth on the exterior of a pipe with the device of claim 1 comprising:
    calculating the depth of a pit on the exterior surface of the pipe with the distance measurements.

15. The method of claim 14, wherein the distance measuring device is a laser scanning device.

* * * * *